Oct. 22, 1929.         P. E. FENTON         1,732,837
RESILIENT SNAP FASTENER ELEMENT
Filed Sept. 27, 1928
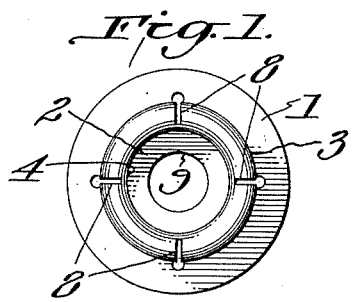
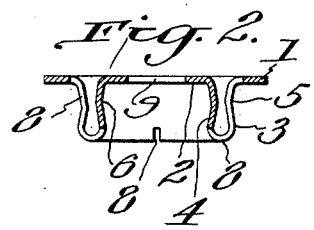
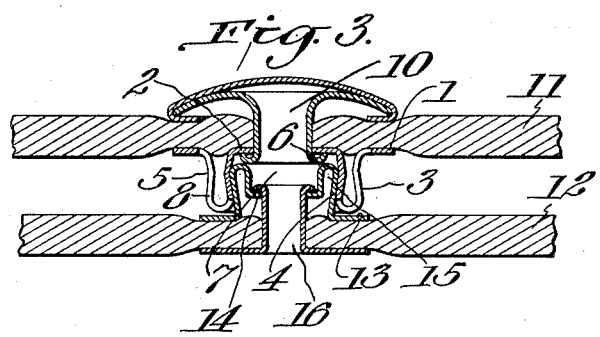
Inventor:
Paul E. Fenton
by
W. H. Finckel
Attorney.

Patented Oct. 22, 1929

1,732,837

UNITED STATES PATENT OFFICE

PAUL E. FENTON, OF THOMASTON, CONNECTICUT, ASSIGNOR TO SCOVILL MANUFACTURING COMPANY, OF WATERBURY, CONNECTICUT, A CORPORATION OF CONNECTICUT

RESILIENT SNAP-FASTENER ELEMENT

Application filed September 27, 1928. Serial No. 308,829.

The object of this invention is to provide a sturdy, long-lived snap-fastener element, preferably a socket.

In the specific illustration of the invention herein explained, the invention consists of a socket having an outer rim and an inner rim, both of which are rigid or non-resilient, and an integral intermediate connection projecting from the adjacent edges of the rims, in the form of an outer wall and an inner wall, the outer wall being slotted longitudinally, thereby to render the element resilient, the slots extending short of the outer edge of the adjacent rim, and the inner rim perforated to receive and be engaged by a rivet, eyelet or other means for setting or attaching the element to cloth or other material support, as I will proceed now to explain and finally claim.

In the accompanying drawings illustrating the invention, in the several figures of which like parts are similarly designated, Figure 1 is a top plan view, and Fig. 2 is a vertical section of one form of resilient socket embodying the invention. Fig. 3 is a vertical section illustrating a snap fastener couple attached to parts to be fastened, the socket element showing the present invention.

The resilient snap fastener element of this invention is the same as those disclosed in my applications filed September 11, 1928, Serial Numbers 305,191 and 305,192, excepting that only the outer wall is slotted, instead of both walls.

The outer rim 1 and the inner rim 2, lie in substantially the same plane, with the intermediate rim-connecting material extending therefrom substantially normal thereto and bent to form the outer wall 3 and the inner wall 4. These walls are bowed, knurled or curved at 5 and 6, respectively, to provide surfaces to engage a complemental stud 7 to effect a union of the snap fastener couple, as illustrated in Fig. 3.

The outer wall 3 is slotted, at 8, from the top toward but not through the outer rim 1; or the slots may extend short of the outer rim as in my cases herein referred to. These slots may extend into the meeting portions of the outer and inner walls as herein shown.

The inner rim 2, has a central perforation 9, to receive and be engaged by a capped eyelet 10, the barrel of which is clinched therein, as shown in Fig. 3, to set or attach the element; but the invention is not limited to the means for setting or attaching, nor to any particular form of stud.

The part 11 may represent one portion of an article to be fastened, on which the socket is set, and the part 12 may represent the other portion on which the stud is set.

As shown in Fig. 3, the stud 7 has an outer rim 13, an inner rim 14 and a connecting wall 15, all of which parts are rigid; and the attaching post or rivet 16 by which the stud is attached to the part 12, is passed through the part 12 and an opening in the rim 14 and clinched therein.

As already indicated, the two rims and their connecting walls are in one unitary piece, thus effecting economy in construction and possessing great sturdiness. The inner wall acts as an auxiliary unit to the outer wall in providing a long-lived snap action; and it also provides a support for the outer resilient wall which prevents crushing under the damaging effects of laundering.

The slotting of the outer wall effects a breaking down of the rigidity of that particular wall and serves to provide some resiliency and this is backed up by the opposite non-resilient wall serving as an auxiliary.

The proven fact is that a very few thousandths of an inch of give furnishes the necessary resilient action. It is possible, also, that the solid metal is weakened, by the inclusion of the slots, just enough to permit a slight amount of give or resiliency.

Variations in the details of construction are permissible within the principle of the invention and the claims following.

What I claim is:—

1. A resilient snap fastener element, made in one unitary piece, and having an outer rim and an inner rim, and an outstanding connection bent to form an outer wall and an inner wall serving to unite these rims, the outer wall being slotted longitudinally from the bend, and the inner wall unslotted.

2. A resilient snap fastener element, made in one unitary piece, and having an outer rim and an inner rim, and an outstanding connection bent to form an outer wall and an inner wall serving to unite these rims, the outer wall being slotted longitudinally from the bend, and the inner wall unslotted, the inner rim having an opening to receive and be engaged by an attaching device.

In testimony whereof I have hereunto set my hand this 26th day of September A. D. 1928.

PAUL E. FENTON.